United States Patent
Bondarowicz et al.

(10) Patent No.: US 6,601,078 B1
(45) Date of Patent: Jul. 29, 2003

(54) TIME-EFFICIENT REAL-TIME CORRELATOR

(75) Inventors: Miroslaw B. Bondarowicz, Bayoone, NJ (US); Jaehyeong Kim, Pine Brook, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/493,057

(22) Filed: Jan. 27, 2000

(51) Int. Cl.[7] .............................. G06F 17/15; G06F 7/38
(52) U.S. Cl. ........................ 708/422; 708/524; 375/150
(58) Field of Search ................ 708/422–426, 708/524; 375/150

(56) References Cited

U.S. PATENT DOCUMENTS

| | | | | | |
|---|---|---|---|---|---|
| 4,270,179 A | * | 5/1981 | Sifford et al. | ............... | 708/422 |
| 4,593,378 A | * | 6/1986 | McWhirter et al. | ......... | 708/426 |
| 4,937,775 A | * | 6/1990 | Engeler et al. | ............. | 708/422 |
| 5,168,459 A | * | 12/1992 | Hiller | ......................... | 708/422 |
| 5,172,334 A | * | 12/1992 | Hienerwadel | ............... | 708/422 |
| 5,442,580 A | * | 8/1995 | Fettweis | ...................... | 708/524 |
| 5,675,608 A | * | 10/1997 | Kim et al. | .................. | 375/150 |
| 5,982,810 A | * | 11/1999 | Nishimori | .................. | 375/150 |
| 6,005,903 A | * | 12/1999 | Mendelovicz | ............... | 708/422 |
| 6,229,843 B1 | * | 5/2001 | Lomp et al. | ................. | 375/150 |
| 6,366,938 B1 | * | 4/2002 | Levison et al. | ............. | 708/422 |
| 6,401,106 B1 | * | 6/2002 | Juan | ............................ | 708/422 |
| 6,411,610 B1 | * | 6/2002 | Li et al. | ..................... | 375/150 |

* cited by examiner

Primary Examiner—Tan V. Mai

(57) ABSTRACT

A time-efficient real-time correlator is provided for use in a receiver of a wireless communications system. The correlator correlates a signal received by the receiver with a pseudo-random number (PN) code in order to determine the time delay of the received signal. The correlator requires no memory for storing samples of the received signal. A shift register having only W storage elements is utilized for storing the samples of the PN code sequence, where W is a positive integer corresponding to the length of the correlation window. W+1 correlation results storage elements are utilized to store correlation result values. When the correlator receives a current sample of the incoming signal, the current sample $r(j)$ is multiplied by each of the samples of the PN code sequence to obtain products. The correlation result values stored in the correlation results storage elements are added to the products and the resulting sum is stored in the correlation results storage elements. Once M samples of the received signal have been correlated with the PN code samples, the correlation result values contained in the correlation result storage elements are mature. These correlation result values may then be processed to determine the time delay of the received signal. The correlator has increased throughput and decreased memory requirements, thereby enabling real-time operations to be performed in a time-efficient manner while also requiring fewer resources.

20 Claims, 2 Drawing Sheets

TIME-EFFICIENT REAL-TIME CORRELATOR

TECHNICAL FIELD OF THE INVENTION

The present invention relates to correlators utilized in receivers of base stations and mobile units of wireless systems. More particularly, the present invention relates to a time-efficient real-time correlator that is suitable for use in receivers of base stations and mobile units of wireless systems.

BACKGROUND OF THE INVENTION

Wireless systems utilize a communication protocol known as Code Division Multiple Access (CDMA). In CDMA, a communication channel uses a common frequency band. In the reverse-link (i.e., from the mobile to the base station), different mobile units are identified by using different psuedo-random number (PN) codes. In the forward-link (i.e., from the base station to the mobile unit), all base stations use the same PN codes but are identified by different offsets. Any time data is transmitted between a base station and a mobile unit, the transmission includes a PN code. The PN codes are fixed and are known to both the base station and the mobile units. However, there is a time-offset between them due to round trip delay of the transmission signal. If the time-offset is not correctly estimated, the received signal looks like nothing but noise. The receivers of the base stations and of the mobile units comprise correlators that correlate the incoming PN code with stored PN codes to determine the offset. The estimated offset is utilized to synchronize the received signal so that the received data can be decoded. It is also utilized to identify the base station in the case of the forward-link. Therefore, correlation of the PN codes is used for timing recovery.

The correlators that are currently utilized in the receivers of the base stations and mobile units for correlating the PN codes either do not perform the correlation in real-time or do not perform the correlation in real-time in an efficient manner. FIGS. 1 and 2 correspond to known correlators. Prior to describing the manner in which these known correlators perform the correlation methods, the correlation process will be mathematically described in order to facilitate the discussion of these correlators.

When a discrete-time sequence exists that corresponds to a time-delayed version of a known sequence plus noise, the time delay can be determined by the correlator. The functionality of the correlator is defined as follows. Letting the known discrete-time sequence be p(i), then the received signal r(i), which corresponds to a version of the sequence p(i) delayed by N-time units plus noise n(i), can be stated as:

$$r(i) = p(i-N) + n(i), \qquad \text{(Equation 1)}$$

where i is a discrete time index defined as $i \in \{\ldots, -3, -2, -1, 0, 1, 2, 3, \ldots\}$. The correlator calculates the correlation result, C(k), as follows:

$$C(k) = \sum_{i=0}^{M-1} r(i+k)p(i), \; k \in \{0, 1, 2, \ldots, W\}, \qquad \text{(Equation 2)}$$

where M is the coherent integration length and W is the maximum time delay, or search window. If C(k) is the largest correlation result of all $\{C(0), C(1), C(2), \ldots, C(K), \ldots C(W)\}$, then k corresponds to the estimated time delay, or time shift. This can be seen from Equation 3, which can be derived from Equations 1 and 2 as follows:

$$C(k) = \sum_{i=0}^{M-1} p(i+k-N)p(i) + \sum_{i=0}^{M-1} n(i+k)p(i) \qquad \text{(Equation 3)}$$

The first term is the signal component and the second term is the noise component. The signal component has the largest value when k is equal to N. As the value of the coherent integration length M increases, the time delay estimation becomes more precise.

With respect to the correlator shown in FIG. 1, the received signals are stored in memory before being processed. The received signal is represented by the horizontal row 1 comprised of blocks 2. The received signal r(i) is correlated with a PN sequence generated by a PN code generator (not shown) comprised by the receiver. Each of the blocks 2 corresponds to a sample of the received signal. Each of these samples is commonly referred to as a "chip". The blocks 3, 4, 5 and 6 correspond to the generated PN sequence that is cross-correlated with r(i) to obtain the correlation results C(0) through C(W). The blocks 3, 4, 5 and 6 are shifted to represent the cross-correlation process over the correlation window W. The best correlation result corresponds to a match between the received PN sequence and the generated PN sequence. The time shift associated with the match corresponds to the time delay of the received signal r(i) (i.e., the number of chips that the received signal is offset with respect to the generated PN sequence).

Assuming each r(i) sample has B bits and each p(i) sample has H bits, then (M+W)B+MH bits of memory are needed to store the received signal and the PN sequence. In the case of the reverse-link, the length of the PN code is considered to be almost infinite (e.g., 2 to the power of 42). Therefore, an entire PN code can not be correlated with the received signal r(i). Rather, the PN code and the received signal r(i) are cross-correlated over M samples, where M is reasonably large for reliable estimation. For the same reason, the PN codes are generated instead of memorized. Algorithms executed by the mobile units and by the base stations inform the correlators as to what the PN sequence should be at any given time of day. The correlators then attempt to find a matching PN sequence by performing the M-length cross-correlation process for each possible offset, where W possible offsets exist.

Furthermore, the correlation process is not a real-time process because the correlation calculations do not begin until after the arrival of the last sample, r(M+W−1), of the received signal r(i). In order for the correlation process to be performed in real-time, the correlation results C(0) through C(W) must be available by the time the last sample of the received signal, r(M+W−1), has been received. Also, the multiplication and addition operations associated with each correlation of the generated PN code and the received signal must be performed in a single sample period.

The correlator shown in FIG. 2 uses a finite impulse response (FIR) filter 7 to perform the correlation process in real-time. The filter 7 is an M-th order FIR filter having the generated PN code, p(i), as its coefficients. A period of time equal to M chips is required for the received signal r(1) through r(M−1) to be shifted into the register 8. The register 8 comprises M storage elements 9. Assuming each sample of the received signal comprises B bits, the filter 7 requires M×B bits of memory for storing the received signal and M×H bits of memory for storing the generated PN sequence p(0) through p(M−1). Therefore, the amount of memory needed for the correlator shown in FIG. 2 is less than the amount needed for the correlation scheme represented by FIG. 1. Essentially, the amount of memory needed for the correlator of FIG. 2 is W×B bits less than the amount of memory required for the correlation scheme represented by FIG. 1. However, W normally is small in comparison to M. Therefore, the reduction in the amount of memory needed for implementation of the correlator shown in FIG. 2 is not extremely significant.

Once the last sample r(M−1) has arrived, each sample is multiplied by its respective PN code sample by multipliers 10. The products are then summed by accumulator 11 to produce the correlation results C(0) through C(W). These operations are mathematically defined by Equation (2). M multiplications and M−1 additions are performed per input sample in order for the process to meet the real-time requirements. Therefore, the processor that performs the multiplication and addition operations must be fast enough to perform M multiplications and M−1 additions per input sample period, which can be difficult to achieve. For each new sample of the received signal, all of the multiplications and additions must be performed during the sample period. This is a large amount of processing to be performed in a very short time interval.

Also, although the correlator shown in FIG. 2 performs the correlation process in real-time, it is not time-efficient. The processor is only active for W chips, or sample times, out of the total number of sample times, M+W−1. For example, if the coherent integration length (M) is 1000 and the search window (W) is 100, the processor is only active about 9% of the time (i.e., 100/1,099). Therefore, the correlator of FIG. 2 does not utilize its resources in a time-efficient manner because it is only active a small percentage of the time, and when it is active, it must perform all of the calculations within a very small time interval.

Accordingly, a need exists for a correlator that is capable of time-efficient performance of the correlation process in real-time and that has relatively small memory requirements in comparison to the aforementioned correlators.

SUMMARY OF THE INVENTION

The present invention provides a time-efficient real-time correlator for use in a receiver of a wireless communications system. The correlator correlates a signal received by the receiver with a pseudo-random number (PN) code in order to determine the time delay of the received signal. The correlator requires no memory for storing samples of the received signal. A shift register having only W storage elements is utilized for storing the samples of the PN code sequence, where W is a positive integer corresponding to the length of the correlation window. Storage elements equal in number to W+1 are utilized for storing correlation result values.

When the correlator receives a current sample r(j) of the incoming signal, the current sample r(j) is multiplied by each of the samples of the PN code sequence to obtain products. The correlation result values stored in the correlation results storage elements are added to the products and the resulting sum is stored in the correlation results storage elements. Once M samples of the received signal have been correlated with the PN code samples, the correlation result values contained in the correlation results storage elements are mature. These correlation result values may then be processed to determine the time delay of the received signal. The correlator has increased throughput and decreased memory requirements, thereby enabling real-time operations to be performed in a time-efficient manner while also requiring fewer resources.

These and other features and advantages of the present invention will become apparent from the following description, drawings and claims.

DETAILED DESCRIPTION OF THE INVENTION

In accordance with the present invention, a real-time correlator is provided that uniformly distributes the calculation load over time and that requires relatively small memory space. By uniformly distributing the calculation load over time, the correlation process is performed in a time-efficient manner. In addition, the correlation process requires less memory than the techniques discussed above with reference to FIGS. 1 and 2. Prior to describing the correlator of the present invention, the mathematical derivations associated with the correlation process of the present invention will be described.

Letting j=i+k in equation (2), where j∈ {0,1,2,3, . . . , M+W−1}, then $$C(k) = \sum_{j=k}^{M+k-1} r(j)p(j-k) \quad \text{(Equation 4)}$$

For a better understanding, values for k are substituted into Equation (4). Equation (4) then becomes:

$$C(0) = \sum_{j=0}^{M-1} r(j)p(j) \quad \text{(Equation 5)}$$

$$C(1) = \sum_{j=1}^{M} r(j)p(j-1)$$

$$C(2) = \sum_{j=2}^{M+1} r(j)p(j-2)$$

$$\vdots$$

$$C(W) = \sum_{j=W}^{M+W-1} r(j)p(j-W)$$

Figure 3:
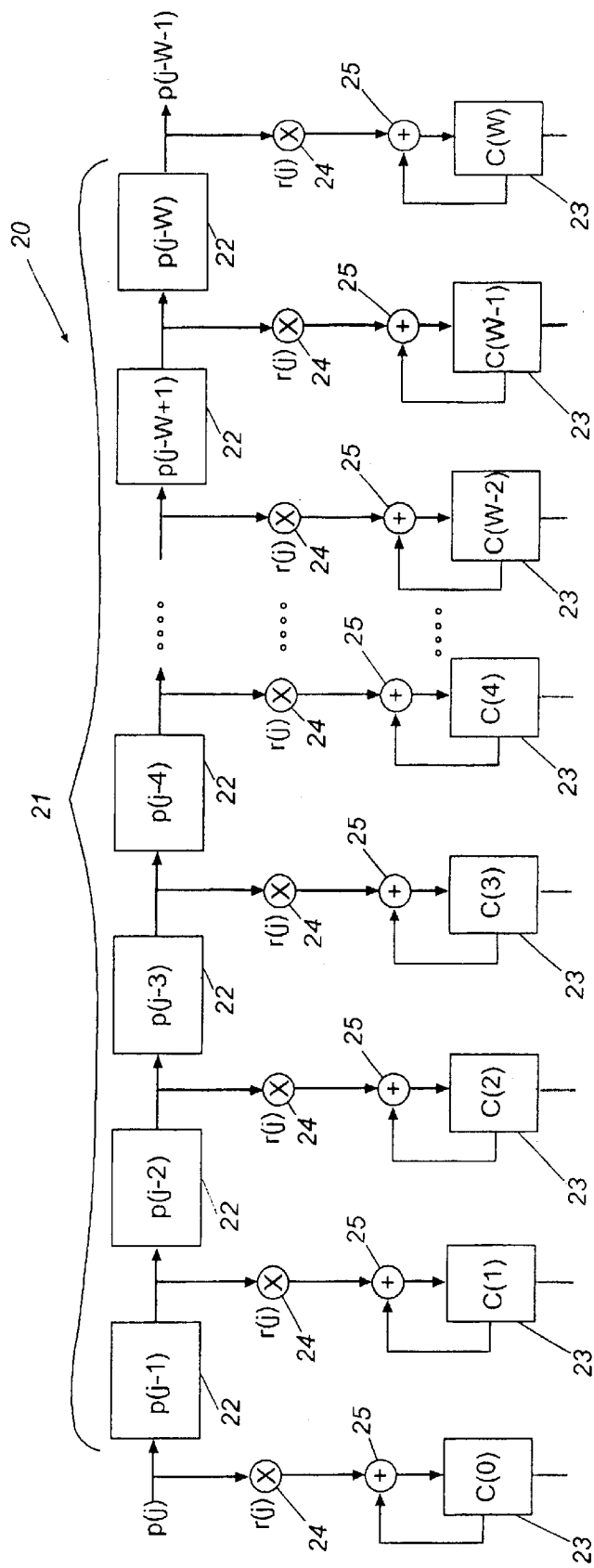
FIG. 3 is a block diagram of the time-efficient real-time correlator of the present invention.

It can be seen from Equation (5) that for a given input signal r(j), W+1 PN code samples are needed to perform the correlation process. The PN code corresponds to p(j) through p(j−W) in Equation 5. As with the correlator discussed above, the PN sequences are generated by a PN code generator (not shown). FIG. 3 illustrates a schematic diagram of the correlator circuit 20 of the present invention that performs the correlation process described by Equation (5). As shown in FIG. 3, a shift register 21 having W storage elements 22 is needed to store the PN sequence p(j) through p(j−W). However, no memory is needed for r(j). W+1 storage elements 23 are needed for accumulating the correlation results C(0) through C(W). Therefore, the total amount of memory needed for storing the PN sequence is (W)H, where H represents the number of bits of each PN sample. This is significantly less than the amount of memory required for implementation of the correlators of FIGS. 1 and 2. The correlator represented by FIG. 1 requires (M+W) B+MH bits of memory whereas the correlator of FIG. 2 requires M×B bits of memory for storing the received signal and M×H bits of memory for storing the generated PN sequence.

Figures 1, 2:
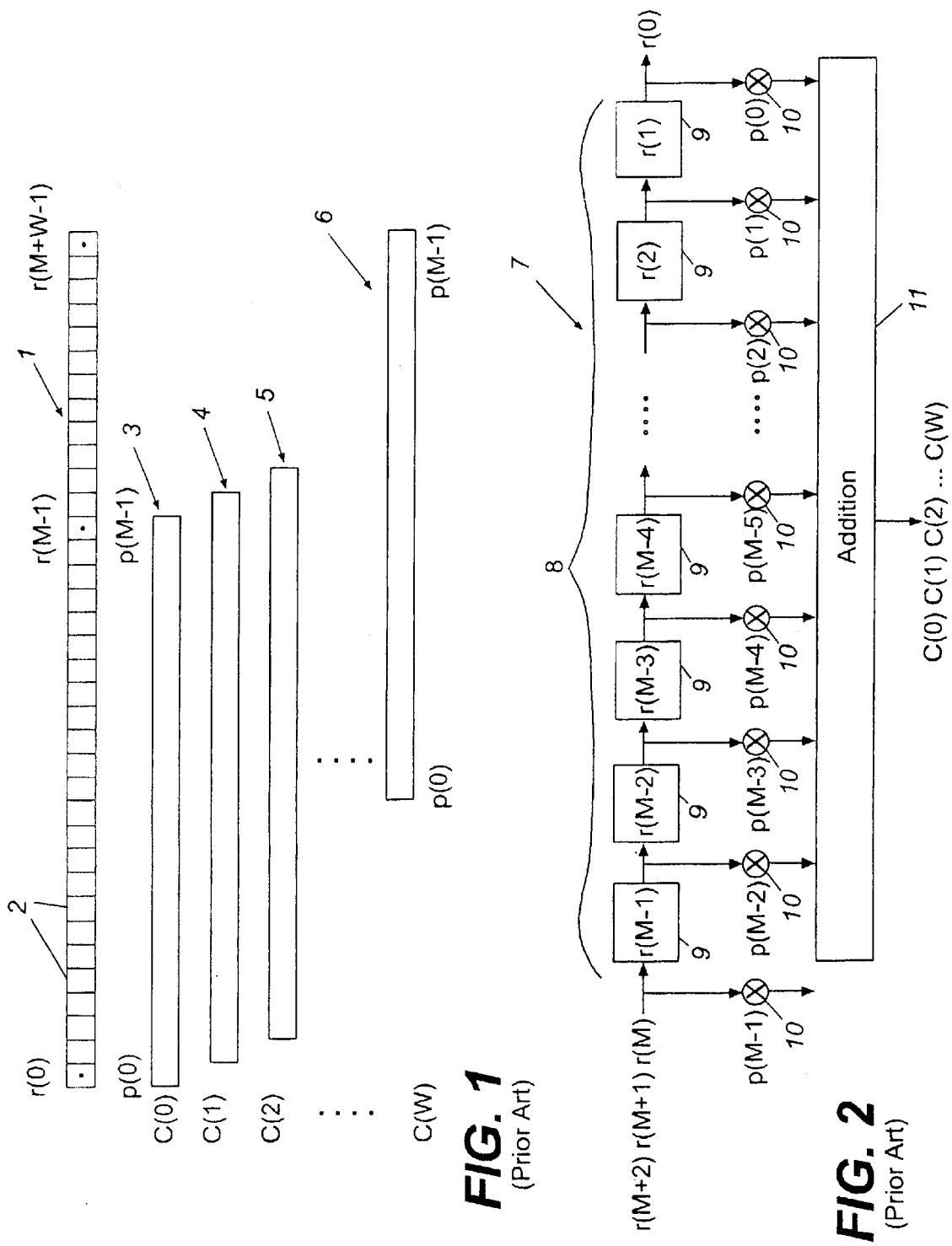
FIG. 1 represents a known correlation process, which is not performed in real-time.
FIG. 2 is a block diagram of a known real-time correlator.

Therefore, the memory requirements of the correlator 20 of the present invention are based on W whereas the memory requirements of the correlators of FIGS. 1 and 2 are based on (M+W) and M, respectively. As stated above, W is normally much less than M (e.g., one-tenth). Therefore, the memory requirements of the correlator 20 of the present invention are significantly less than those of the correlators of FIGS. 1 and 2. The correlator 20 of the present invention performs (W+1) multiplications and (W+1) additions for each input sample. Each sample r(j), which corresponds to the current sample in time, is multiplied by a respective sample of the PN code by a respective multiplier 24 and the result is accumulated by a respective adder 25 in a respective storage element 23. When the next sample r(j) is received, the PN samples are shifted in the direction indicated and are multiplied by the sample r(j). This product is then added to the previous correlation result stored in the respective storage element 23.

Once M×H samples of r(j) have been received and processed in this manner, the correlation results accumulated in the storage elements 23 are mature. The correlation results are then compared with a threshold value to determine which correlation result corresponds to the best match. The number of shifts of the PN sequence that correspond to the best match is then determined to be the time delay of the signal r(j).

The correlator 20 of the present invention preferably is implemented in a Field Programmable Gate Array (FPGA). The FPGA is a processor containing hardware that performs the correlation processes, including the aforementioned shifting, multiplication and accumulation functions. However, the present invention is not limited with respect to the processor that is utilized for performing the correlation functions. An Application Specific Integrated Circuit (ASIC) may also be used for this purpose. A microprocessor programmed with appropriate software may also be used for this purpose.

Once the correlator 20 has obtained the correlation results, the correlation results are output to a digital signal processor (not shown). The digital signal processor (DSP) is programmed with software that analyzes the correlation results to determine which results correspond to correlation candidates. Generally, the DSP compares the correlation results to a threshold value and determines which correlation results exceed the threshold value. The correlation results that exceed the threshold value are selected as candidates. If a correlation result is selected as a candidate, this means that there is a reasonably high likelihood that the correlation result corresponds to the time delay. The selected candidates are processed in accordance with another software routine to determine which of the candidates is most likely to correspond to the time delay. This software routine may be performed by the DSP or by some other functional unit of the receiver.

In order for real-time operation to be achieved, the correlator 20 must be capable of performing W+1 multiplications and W+1 additions per input sample period, i.e., per chip. In other words, W+1 multiplications and W+1 additions must occur during the time period following the immediately preceding shift of the PN sequence and before the next shift of the PN sequence. The correlator 20 of the present invention achieves this objective. Furthermore, since less multiplication and addition operations need to be performed, real time operations can be more easily achieved by the correlator 20 of the present invention than with the correlator of FIG. 2.

As stated above, the correlator of FIG. 2 must perform M multiplications and M−1 additions per input sample period. Furthermore, since the number of multiplications and additions that must be performed by the correlator 20 is reduced, the hardware that is utilized to perform these computations may also be reduced. Preferably, the correlator 20 of the present invention is implemented in a Field Programmable Gate Array (FPGA). By reducing the amount of hardware in the FPGA that is dedicated to performing the multiplication and accumulation functions, these hardware resources can be used for other processing tasks, which may not be related to the correlation process. Also, by decreasing the processing overhead of the correlator 20, the throughput of the correlator 20 can be increased, thereby enhancing overall system performance.

The correlator 20 of the present invention is time-efficient because, unlike the FIR filter approach of FIG. 2, there is no period during which the correlator 20 is idle. For example, if the coherent integration length M is 1000 and the search window W is 100, the speed at which the correlator 20 must operate in order to provide real-time operations is 10% of that of the FIR filter approach. This reduction in the required processing speed is achieved by uniformly distributing the calculation load over time in the manner discussed above with reference to FIG. 3.

Although FIG. 3 illustrates separate processing operations (i.e., multiplication and accumulation) for each correlation result C(k), this is not required. The correlator 20 may utilize W+1 separate processors to perform these operations, or a single processor that performs multiple operations for multiple correlation results C(k). For example, it will be assumed for exemplary purposes that the signal r(j) is being received by the correlator 20 at a speed of 4 megahertz (MHz). Assuming that the processor clock speed is 40 MHz and that each multiplication and accumulation operation requires 2 clock cycles, one processor can calculate 5 correlation results C(k). Consequently, real-time operations can be achieved by using (W+1)/5 processors, with each processor generating 5 correlation results C(k). This feature of the present invention provides very useful and simple guidelines for efficient implementation of the correlator 20 in an Application Specific Integrated Circuits (ASIC) or in a Field Programmable Gate Array (FPGA).

It should be noted that the correlator 20 shown in FIG. 3 may be implemented solely in hardware or in a combination of hardware and software. The present invention is not limited with respect to the manner in which these functions are implemented. Also, the present invention is not limited to any particular types of storage elements for storing the PN sequences and the correlation results. Those skilled in the art will understand that the shifting, multiplication, addition and storage operations performed by the correlator 20 may be performed solely in hardware or in a combination of hardware and software, such as a computer program being executed by a microprocessor. In the latter case, the software would be stored in a computer-readable medium that is accessible by the microprocessor. The computer-readable medium could be inside of or external to the microprocessor. Computer-readable mediums that are external to the microprocessor could include, for example, a solid state memory device, a magnetic storage medium or an optical storage medium.

It should be noted that the present invention has been described with reference to particular embodiments, but that the present invention is not limited to these embodiments. Those skilled in the art will understand that modifications may be made to the embodiments discussed herein that are within the scope of the present invention.

What is claimed is:

1. A correlator for use in a receiver of a wireless communications system, the correlator correlating a signal received by the receiver with a psuedo-random number (PN) code sequence to determine a timing delay of the received signal, the correlator comprising:

a shift register, the shift register comprising a plurality of storage elements, each storage element being configured to store a sample of the PN code sequence, each sample of the PN code sequence being comprised of H bits, wherein H is an integer that is greater than or equal to 1;

multiplier logic, the multiplier logic being configured to multiply each sample of the PN code sequence stored in the shift register by a sample r(j) of the received signal to produce a plurality of products, each product being associated with a respective storage element of the shift register;

a plurality of correlation result storage elements, each correlation result storage element being configured to store a most recent correlation result value, each correlation result value being associated with a respective storage element of the shift register, each correlation result storage element having an output; and accumulator logic, the accumulator logic being configured to add each product produced by the multiplier logic to an associated correlation result value stored in an associated correlation result storage element and output from the associated correlation result storage element to the accumulation logic.

2. The correlator of claim 1, wherein the correlator performs the operations represented by the equation:

$$C(k) = \sum_{j=k}^{M+k-1} r(j)p(j-k)$$

where M is a positive integer, j is a positive integer ranging from 0 to (M+W−1), W is a positive integer, and k is a positive integer ranging from 0 to W, and wherein when M+W samples r(j) have been processed by the correlator, the correlation results stored in the correlation results storage elements correspond to final correlation result values.

3. The correlator of claim 2, wherein the shift register comprises W storage elements.

4. The correlator of claim 3, wherein the correlator comprises W+1 correlation result storage elements.

5. The correlator of claim 4, wherein the correlator comprises W+1 processors, the processors comprising the multiplier and accumulator logic, each processor multiplying a particular sample of the PN code sequence by the sample r(j) and adding the product to an associated correlation result value.

6. The correlator of claim 4, wherein the correlator comprises a plurality of processors, the processors comprising the multiplier and accumulator logic, each processor multiplying a plurality of the samples of the PN code sequence by the sample r(j) and adding the products to associated correlation result values.

7. The correlator of claim 4, wherein the correlator is implemented as a Field Programmble Gate Array (FPGA), and wherein the FPGA comprises one processor, the processor corresponding to the multiplier and accumulator logic, wherein the processor performs all of the multiplication and accumulation operations.

8. The correlator of claim 2, wherein the correlator produces the final correlation result values in real-time, and wherein the multiplication operations and the addition operations performed by the multiplier and the accumulator logic, respectively, on a particular sample r(j) of the received signal are performed in a single sample period, the sample period corresponding to an amount of time that a sample of the PN code sequence is stored in a storage element of the shift register before being shifted to a next storage element of the shift register.

9. The correlator of claim 2, wherein the correlator produces the final correlation result values in real-time, and wherein the multiplication operations and the addition operations performed by the multiplier and the accumulator logic, respectively, on a particular sample r(j) of the received signal are performed in a single sample period, the sample period corresponding to an amount of time that a sample of the PN code sequence is stored in a storage element of the shift register before being shifted to a next storage element of the shift register.

10. The correlator of claim 1, wherein the receiver is comprised in a base station of the wireless communications system.

11. The correlator of claim 1, wherein the receiver is comprised in a mobile unit of the wireless communications system.

12. A correlator for use in a receiver of a wireless communications system, the correlator correlating a signal received by the receiver with a psuedo-random number (PN) code sequence to determine a timing delay of the received signal, the correlator comprising:

a shift register, the shift register comprising W storage elements, where W is a positive integer, each storage element being configured to store a sample of the PN code sequence, each sample of the PN code sequence being comprised of H bits, wherein H is an integer that is greater than or equal to 1;

multiplier logic, the multiplier logic being configured to multiply each sample of the PN code sequence stored in the shift register by a sample r(j) of the received signal to produce W+1 products, each product being associated with a respective storage element of the shift register, the received signal being comprised of M samples, where M is a positive integer;

W+1 correlation result storage elements, each correlation result storage element being configured to store a most recent correlation result value, each correlation result value being associated with a respective storage element of the shift register, each correlation result storage element having an output; and accumulator logic, the accumulator logic being configured to add each product produced by the multiplier logic to an associated correlation result value stored in an associated correlation result storage element and output from the associated correlation result storage element to the accumulation logic.

13. The correlator of claim 11, wherein the correlator performs the operations represented by the equation:

$$C(k) = \sum_{j=k}^{M+k-1} r(j)p(j-k)$$

where C(k) is a correlation result value, k is a positive integer ranging from 0 to W, and j is a positive integer ranging from 0 to (M+W−1), and wherein when said M+W samples have been processed by the correlator, the correlation results stored in the correlation results storage elements correspond to final correlation result values.

14. The correlator of claim 12, wherein the correlator produces the final correlation result values in real-time, and wherein the multiplication operations and the addition operations performed by the multiplier and the accumulator logic, respectively, on a particular sample of the received signal are performed in a single sample period, the sample period corresponding to an amount of time that a sample of the PN code sequence is stored in a storage element of the shift register before being shifted to a next storage element of the shift register.

15. A method for correlating a signal received by the receiver with a psuedo-random number (PN) code sequence to determine a timing delay of the received signal, the method comprising the steps of:

storing a plurality of samples of the PN code sequence in a shift register memory device, each sample of the PN code sequence being comprised of H bits, wherein H is an integer that is greater than or equal to 1;

multiplying each sample of the PN code sequence by a sample r(j) of the received signal to produce a plurality of products; and adding each product produced by the multiplying step to an associated correlation result value stored in an associated correlation result storage element and output from the associated correlation result storage element; and storing each sum as a new correlation result in the associated correlation result storage element.

16. The method of claim 15, wherein the multiplying and adding steps can be represented by the equation:

$$C(k) = \sum_{j=k}^{M+k-1} r(j)p(j-k)$$

where M is a positive integer, j is a positive integer ranging from 0 to (M+W−1), W is a positive integer, and k is a positive integer ranging from 0 to W, and wherein when M+W samples r(j) have been processed in accordance with the multiplying and adding steps, the new correlation results stored in the correlation results storage elements correspond to final correlation result values.

17. The method of claim 16, wherein W samples of the PN code sequence are stored in the memory device.

18. The method of claim 17, wherein W+1 correlation result storage elements are used for storing the correlation results.

19. The method of claim 16, wherein the final correlation result values are produced in real-time, and wherein the multiplying and adding steps performed on a particular sample r(j) of the received signal are performed in a single sample period, the sample period corresponding to an amount of time that a sample of the PN code sequence is stored in a storage location of the memory device before being shifted to a next storage location of the memory device.

20. A computer program for correlating a signal received by the receiver with a psuedo-random number (PN) code sequence to determine a timing delay of the received signal, the computer program being embodied on a computer-readable medium, the computer program comprising:

a first code segment for storing a plurality of samples of the PN code sequence in a shift register memory device, each sample of the PN code sequence being comprised of H bits, wherein H is an integer that is greater than or equal to 1;

a second code segment for multiplying each stored sample of the PN code sequence by a sample r(j) of the received signal to produce a plurality of products; and a third code segment for adding each product produced by the second code segment to an associated correlation result value stored in an associated correlation result storage element and output from the associated correlation result storage element and storing the sums as new correlation results in the associated correlation result storage elements.

* * * * *